United States Patent
Dunne

(10) Patent No.: US 9,964,805 B2
(45) Date of Patent: May 8, 2018

(54) BACKLIGHTING TECHNIQUE FOR LIQUID CRYSTAL AND OTHER DISPLAYS IN ELECTRONIC INSTRUMENTS

(71) Applicants: Laser Technology, Inc., Centennial, CO (US); Kama-Tech (HK) Limited, Hong Kong (CN)

(72) Inventor: Jeremy G. Dunne, Parker, CO (US)

(73) Assignees: Laser Technology, Inc., Centennial, CO (US); Kama-Tech (HK) Limited, Hong Kong (HK)

(*) Notice: Subject to any disclaimer, the term of this patent is extended or adjusted under 35 U.S.C. 154(b) by 0 days. days.

(21) Appl. No.: 15/249,163

(22) Filed: Aug. 26, 2016

(65) Prior Publication Data

US 2018/0059481 A1    Mar. 1, 2018

(51) Int. Cl.
  *G02F 1/13* (2006.01)
  *G02B 27/01* (2006.01)
  *G01P 3/36* (2006.01)
  *G01C 3/00* (2006.01)
  *G02F 1/1335* (2006.01)
  *G02B 27/02* (2006.01)

(52) U.S. Cl.
  CPC .. *G02F 1/133606* (2013.01); *G02F 1/133603* (2013.01); *G01C 3/00* (2013.01); *G01P 3/36* (2013.01); *G02B 27/026* (2013.01); *G02B 2027/0147* (2013.01); *G02F 2001/133607* (2013.01)

(58) Field of Classification Search
  CPC .. G02F 1/133602–1/133606; G02F 1/133608; G02F 1/133611; G02F 2001/133607; G01C 3/00–3/085; G01P 3/36–3/40; G02B 27/01–27/0103; G02B 27/026
  See application file for complete search history.

(56) References Cited

U.S. PATENT DOCUMENTS

| | | | | |
|---|---|---|---|---|
| 5,897,611 A * | 4/1999 | Case | G01B 11/00 356/400 |
| 2006/0039065 A1* | 2/2006 | Dunne | G01C 15/002 359/399 |
| 2006/0285233 A1* | 12/2006 | Dunne | G01C 3/08 359/833 |
| 2007/0091613 A1* | 4/2007 | Lee | G02F 1/133602 362/326 |
| 2009/0279180 A1* | 11/2009 | Amitai | G02B 13/22 359/633 |
| 2010/0315320 A1* | 12/2010 | Yoshida | G02F 1/133603 345/83 |

(Continued)

FOREIGN PATENT DOCUMENTS

WO    WO 2016069214 A1 *    5/2016    ............. G01C 3/02

*Primary Examiner* — Mariceli Santiago
(74) *Attorney, Agent, or Firm* — William J. Kubida; Hogan Lovells US LLP

(57) ABSTRACT

A backlight system for a display device which comprises a light emitting diode comprising an encapsulating lens and an aspheric lens interposed between the light emitting diode and the display device. The backlight system provides a luminance of substantially 100K nits at a cone angle of substantially 12° and is of particular utility in conjunction with laser-based range and speed measurement instruments.

9 Claims, 3 Drawing Sheets

(56) References Cited

U.S. PATENT DOCUMENTS

2013/0279013 A1* 10/2013 Edwards ............ G02B 27/0189
359/630
2016/0139408 A1* 5/2016 Yagi ................... G02B 27/0101
359/633

* cited by examiner

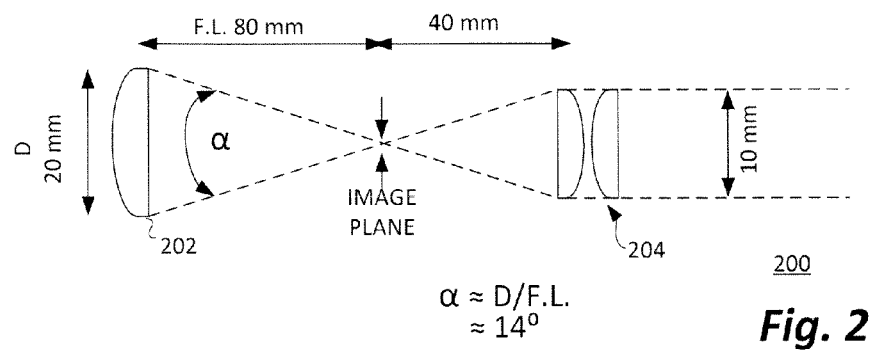
Fig. 2
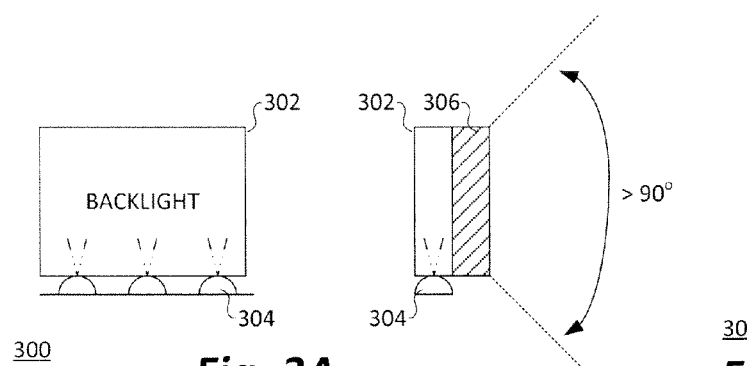
Fig. 3A
Prior Art
Fig. 3B
Prior Art
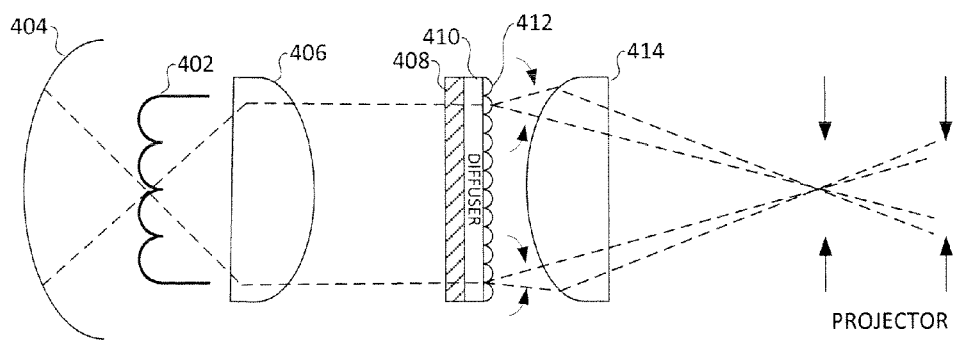
Fig. 4
Prior Art

BACKLIGHTING TECHNIQUE FOR LIQUID CRYSTAL AND OTHER DISPLAYS IN ELECTRONIC INSTRUMENTS

BACKGROUND OF THE INVENTION

The present invention relates, in general, to the field of techniques for illuminating displays in electronic instruments. More particularly, the present invention relates to a backlighting technique for liquid crystal displays (LCDs) and other display devices in electronic instruments, for example, laser-based distance and speed measurement instruments.

The problem with backlighting for in-scope displays for rangefinding instruments intended for sports optics applications, for example, is that 85% light transmission of the scene may be desired leaving only 15% available for the display system. In actuality it may be even less than that. Therefore, the problem may be illustrated given a white wall in full sun has an effective illuminance of 100K to 120K nits where a "nit" is commonly defined as a unit of visible-light intensity used to specify the brightness of a liquid crystal display wherein one nit is equivalent to one candela per square meter.

With the above given display ratio of 85/15=5.67 one would require something closer to 500K nits (or on the order of 567-680K nits) to match the sunlight illuminance which cannot be done with currently available technology as there is no display bright enough to do that. However in practice, even a display illuminance of on the order of 100K nits exhibits good enough contrast under these conditions. As an example of currently available devices, a good organic light-emitting diode (OLED) display may be on the order of 40K nits while typical liquid crystal display (LCD) backlight displays are only around 6K nits with about 100K nits being what is required. In currently available laser rangefinders for sports optics applications a backlight LCD display may require about 64 milliamps of current to generate about 6K nits. Consequently, in bright sunlit conditions (like on a golf course) a special coating is required to block the visible illumination down by about a factor of six in order to make the display visible at 64 milliamps.

SUMMARY OF THE INVENTION

Therefore, it would be highly desirable to provide a backlight system providing at least substantially 100K nits for use in laser-based distance and speed measurement devices.

Specifically provided herein is a backlight system for a display device which comprises a light emitting diode comprising an encapsulating lens and an aspheric lens interposed between the light emitting diode and the display device. In operation, the backlight system provides a cone angle of substantially 12°. In a representative embodiment, the light emitting diode provides an apparent source of substantially 1.6 mm and comprises a large area light emitting diode having an edge bondout configuration. In a further representative embodiment of the present invention the system has a focal length of substantially 7.5 mm and the display device comprises an LCD. The system is operative to provide a luminance of substantially 100K nits.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 2 is a simplified illustration of a representative imaging system comprising a single lens having a diameter of 20 mm and a focal length of 80 mm to an image plane;

FIGS. 3A and 3B illustrate a conventional LCD display backlighting technique wherein the backlight comprises a number of light emitting diodes (LEDs) directed along an edge of a backlighting substrate adjoining an LCD display;

FIG. 4 is an illustration of a conventional projector system for providing controlled illumination to a display device.

DESCRIPTION OF A REPRESENTATIVE EMBODIMENT

Figure 1:
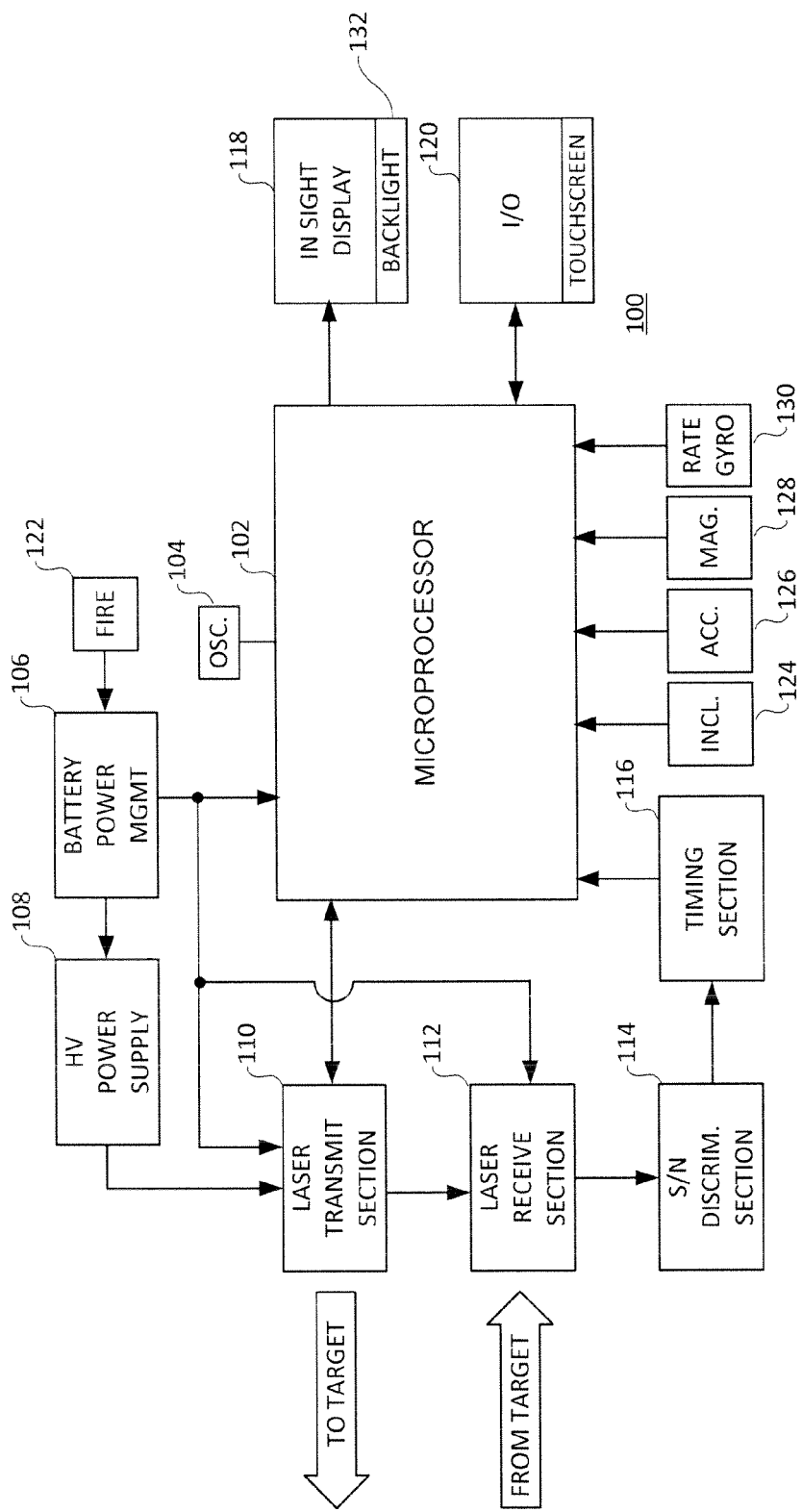
FIG. 1 is a representative functional block diagram of a laser rangefinding and speed measurement instrument for possible incorporation of the backlighting technique of the present invention.

With reference now to FIG. 1, a representative functional block diagram of a laser rangefinding and speed measurement instrument 100 is shown for possible incorporation of the backlighting technique of the present invention.

The exemplary instrument 100 comprises a microprocessor 102 or central processing unit (CPU) with an associated oscillator 104 for providing clocking signals to the microprocessor 102. A battery and power management section 106 supplies operating power to the microprocessor 102 and various other instrument subsystems (not shown) as well as the high voltage (HV) power supply 108 which provides operating voltage to a laser transmit section 110 and associated laser diode as well as a laser receive section 112 and associated photodiode.

The laser receive section 112 receives a portion of the laser energy transmitted by the laser transmit section 110 as reflected by a target through a photodiode and provides the return signals to a signal/noise (S/N) discriminator section 114 in order to separate true return pulses from any associated noise. A timing section 116 accurately measures the time between the transmission of laser pulses from the laser transmit section 110 and the reception of the same target reflected pulses at the laser receive section 112 to determine, in conjunction with the microprocessor 102, the distance to the particular target towards which the instrument 100 is aimed. A fire button 122 is coupled to the battery and power management section 106 and is operable by a user of the instrument 100 in conjunction with the microprocessor 102 to determine when to emit pulses toward a target from the laser transmit section 110.

The instrument 100 may also incorporate a user viewable display 118 implemented in conjunction with the backlighting technique of the present invention, which may include a view of the target in conjunction with an aiming reticle as well as information regarding the range to the target, speed of the target, battery condition and other information. The instrument 100 may also comprise a touchscreen display to allow user inputs to the instrument 100 in conjunction with, or as an alternative to, an input/output (I/O) section 120.

The I/O section 120 may comprise a keypad or other means of communicating information to or from the microprocessor 102 including wired connections such as a universal serial bus (USB) and the like as well as wireless connections such as an IEEE 802.11 (WiFi), or other wireless local area network (WLAN) transceiver; a Bluetooth transceiver or other personal are network (PAN) system for wirelessly exchanging data over short distances; and/or another near field communication (NFC) transceiver (inclusive of infrared (IR) coupling) for wirelessly coupling the instrument 100 to external devices or data storage elements.

As illustrated, the instrument 100 may further include one or more of an inclinometer 124, accelerometer, 126, magnetic sensor 128 and/or rate gyro 130. As an exemplary utilization of the backlighting technique for LCDs and other display devices in electronic instruments or the present invention, the instrument 100 is illustrated as incorporating a backlight 132.

With reference additionally now to FIG. 2, a simplified illustration of a representative imaging system 200 is shown comprising a single objective lens 202 having a diameter (D) of 20 mm and a focal length (F.L.) of 80 mm to an image plane. The system 200 provides an exit pupil size through eyepiece 204 corresponding to D/MAG$^N$ or 20 mm/X2=10 mm. In the imaging system 200 illustrated, the illumination cone angle $\alpha \approx 14°$.

Ideally, one wants to ensure that the display system focuses the light from the display into the exit pupil of the sports optics rangefinder system. The exit pupil is defined by the objective diameter lens 202 diameter D divided by the magnification of the optical system. Given a 20 mm objective lens 202 with a magnification of 2 the exit pupil is 10 mm. In other words, the size of the exit pupil is determined by the size of the objective lens 202 divided by the magnification but the cone angle that creates that is the important thing so whatever the exit pupil is, if the magnification is increased to 4 the exit pupil would be 20 mm/X4=5 mm. The idea is, under any circumstances, even if the eyepiece is changed out, it is desired that the display projection system, (the cone angle of illumination) match or not exceed, the cone angle of illumination of the visible pathway. So in the case of a relatively small exit pupil, if the user of the instrument moves his eye just a little bit of center, the view simply blanks out. In those cases where a manufacturer of an electronic instrument display attempts to concentrate the energy in this manner the usability is resultantly unacceptable. Conversely, if the exit pupil is overfilled and a user of the instrument can still see the display while moving outside the target view, energy is obviously being wasted. Therefore, it would be highly desirable to get the cone angle of illumination to match or slightly under fill the exit pupil with the display in order to get as much light as possible through the display.

With reference additionally now to FIGS. 3A and 3B, a conventional LCD display backlighting technique 300 is shown wherein the backlight comprises a number of light emitting diodes (LEDs) 304 directed along an edge of a backlighting substrate 302 adjoining an LCD display 306. As depicted, the conventional backlighting technique 300 provides a relatively wasteful light dispersion of greater than 90°.

As previously discussed OLEDs provide good illumination but they are comparatively expensive, can be damaged by exposure to water and can use even more power than an LCD in the display of an image with a white background. Conventional backlit LCD displays are the least expensive projection system but, in practice, are very dim with a conventional backlight. As illustrated, the backlighting substrate 302 includes a series of LEDs 304 which inject light sideways onto a series of prismatic reflectors. Consequently, this light is dispersed outward through the LCD display 306 but it is dispersed across the whole panel over a greater than 90° cone angle which is very wasteful of light. The result is that only 6K nits illuminance is achieved when approximately 100K nits is actually required in practice.

With reference additionally now to FIG. 4, an illustration of a conventional projector system 400 is shown for providing controlled illumination to a display device. The conventional system 400 comprises an illumination source such as a filament 402 and associated reflector 404 in conjunction with a lens 406. Illumination from the combination of these elements is directed toward a display device 408 and associated diffuser 410 comprising a number of diffusing elements 412 for direction toward an additional lens 414 to produce a projected image as indicated.

The projector system 400 is an alternative conventional approach to that illustrated and described with respect to FIGS. 3A and 3B and it functions by employing an illumination source, a reflector 404 behind the source with a first collimating lens 406 and a controlled diffuser 410. The controlled diffuser 410 is typically formed by crossed cylinder lenses in order to provide a controlled illumination so that a cone angle is formed that goes to the projector plane to provide a controlled illumination to the projector system 400. However, it is obvious that the projector system 400 requires a lot of space and requires multiple optical elements with all the attendant alignment issues of these elements. In addition to being relatively expensive to produce, such a system will simply not fit in an electronic instrument such as a laser-based rangefinder intended for sports optics applications.

Figure 5A:
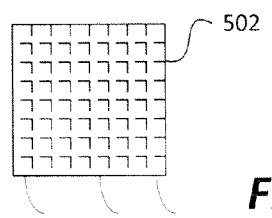
FIGS. 5A and 5B illustrate a representative embodiment of a system for implementing the backlighting technique for LCD and other displays in accordance with the present invention.
Figure 5B:
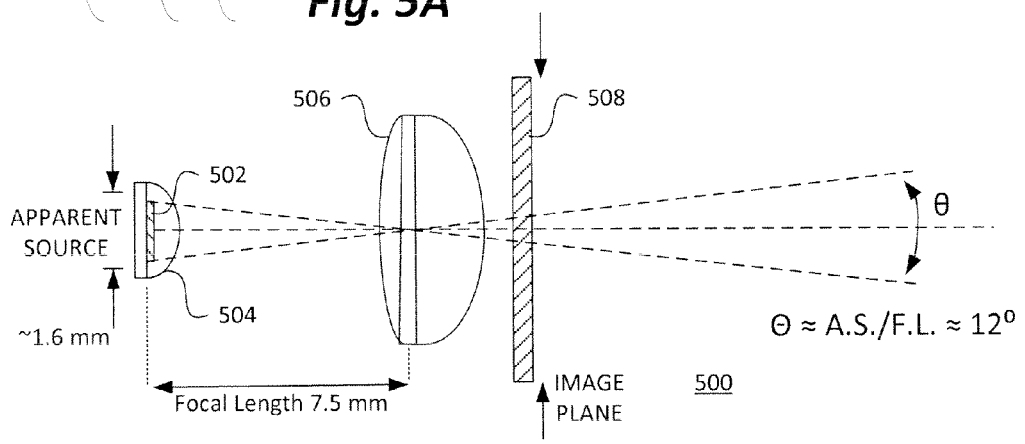

With reference additionally now to FIGS. 5A and 5B, a representative embodiment of a system 500 for implementing the backlighting technique for LCD and other displays in accordance with the present invention is shown. The system 500 utilizes a large area LED 502 illumination source having an edge bond-out configuration as opposed to a center bond-out small area LED. The apparent source of the large area LED 502 may be substantially about 1.6 mm and has an associated lens 504 encapsulating the same. Illumination from the large area LED 502 is directed through a lens 506 to an LCD display device 508 at an image plane as depicted.

The exit pupil in this configuration subtends an angle $\Theta$ which is substantially the apparent source of 1.6 mm divided by the focal length of 7.5 mm or about 12°. This then provides an illumination of approximately 100K nits at a current level of about than 20 ma.

The system 500 of the present invention employs very large area, uniform illumination LEDs 502 for lighting purposes. These large area LEDs 502 provide a relatively large apparent source, (in the embodiment illustrated about 1.6 mm), used in conjunction with an aspheric lens 504 to produce a very fast system (like an F/0.7 lens system) with a focal length (F.L.) of 7.5 mm. The cone angle that determines the display exit pupil is now defined by the apparent source of 1.6 mm divided by 7.5 mm which corresponds to about 12° which is just inside the 14° of the target illumination coming through.

In this manner, the exit pupil visible is just under filled with the display, and because no secondary diffuser elements or multiple optical elements are required (wherein illumination is just being wasted) means that on the order of 60% of all the energy the LED produces is being collected and focused through the display and only concentrating that light through the exit pupil. So, while the system 500 appears to be relatively simple, it nevertheless solves a significant problem because it can produce approximately 100K nits at about 20 milliamps of current or less which is bright enough to work under ideal high brightness outdoor conditions. Given the high throughput optical conditions provided, a user will still be able to see the display on just about any target because the system 500 collects so much energy from the source. In addition, the system 500 does not waste any energy through secondary diffusers, reflectors or any other structure and the illumination cone angle is controlled to substantially match the visual cone angle that defines the exit pupil thereby getting maximum energy focused into the exit pupil.

A representative device which can be used for the LED 502 may be provided as a Cree® XLamp® XP-E2 LED such as the XPLBRO-000-00D01, ROHS compliant, high power LED available from Cree, Inc., Durham, N.C. In practice, the lens 506 should preferably have an aspheric profile as previously noted as a spherical lens would not provide sufficiently uniform exit illumination in this application. The aspheric profile of the lens 506 can be trimmed to compensate for apparent source variations and different angles with the idea that the surface is such that the exit illumination entering the focal and image planes is essentially uniform.

In contrast, conventional LED devices are formed on a relatively small die, (on the order of about 0.3 mm), with a large center bond out wire so the light is emitted around the edges and produces completely non-uniform illumination with a black spot in the middle. They are also very bright around the edges and so, if one were to try to focus that, it would be too narrow and if the wrong spot on the die were being observed, a black image would be seen. In other words, a conventional center bond LED would not work without requiring a lot of excess diffusers which waste light and increase the instrument's power budget. The relatively large area LEDs 502 employed in the system 500 have a very thin bond out along one edge and a very fine grid of connecting wires that cannot be perceived in the display because they are so fine. Such LEDs 502 provide a very uniform illumination area, in this case with the silicon encapsulant or lens 504, the apparent source is now 1.6 mm and the die is about 1.0 mm. Functionally, such large area LEDs 504 provide a very uniform looking 1.6 mm source, which placed in the focal plane, will provide cone angles that match.

While there have been described above the principles of the present invention in conjunction with specific apparatus, devices and structures, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A backlight system for an in-sight display device comprising:
   an edge bond-out, large area, single die light emitting diode comprising an encapsulating lens; and
   an aspheric lens interposed between said light emitting diode and said in-sight display device.

2. The backlight system of claim 1 wherein said light emitting diode provides an apparent source of substantially 1.6 mm.

3. The backlight system of claim 1 wherein said system has a focal length of substantially 7.5 mm.

4. The backlight system of claim 1 wherein said display device comprises an LCD in-sight display device.

5. The backlight system of claim 1 wherein said system provides a luminance of substantially 100K nits.

6. The backlight system of claim 1 wherein said system provides a cone angle of substantially 12°.

7. The backlight system of claim 1 wherein said display device is incorporated in a laser-based range measurement instrument.

8. The backlight system of claim 1 wherein said display device is incorporated in a laser-based speed measurement instrument.

9. The backlight system of claim 1 wherein said light emitting diode comprises an effectively point source of illumination.

* * * * *